United States Patent
Hildebrand

(10) Patent No.: US 10,992,609 B2
(45) Date of Patent: Apr. 27, 2021

(54) TEXT-MESSAGING BASED CONCIERGE SERVICES

(71) Applicant: CloLa, Inc., New York, NY (US)

(72) Inventor: Harold Hildebrand, San Francisco, CA (US)

(73) Assignee: CloLa, Inc., Palos Verdes Peninsula, CA (US)

( * ) Notice: Subject to any disclaimer, the term of this patent is extended or adjusted under 35 U.S.C. 154(b) by 691 days.

(21) Appl. No.: 14/674,979

(22) Filed: Mar. 31, 2015

(65) Prior Publication Data

US 2015/0286937 A1 Oct. 8, 2015

Related U.S. Application Data

(60) Provisional application No. 61/974,363, filed on Apr. 2, 2014.

(51) Int. Cl.
*H04L 12/58* (2006.01)
*H04L 12/18* (2006.01)
*H04W 4/50* (2018.01)

(52) U.S. Cl.
CPC ........ *H04L 51/046* (2013.01); *H04L 12/1859* (2013.01); *H04L 51/04* (2013.01); *H04W 4/50* (2018.02)

(58) Field of Classification Search
CPC ... H04L 51/046; H04L 12/1859; H04L 51/04; H04W 4/50
See application file for complete search history.

(56) References Cited

U.S. PATENT DOCUMENTS

| | | | | |
|---|---|---|---|---|
| 2013/0018879 A1* | 1/2013 | McConnell | ......... | G06F 16/9535 707/728 |
| 2014/0180793 A1* | 6/2014 | Boal | .................. | G06Q 30/0251 705/14.43 |

OTHER PUBLICATIONS

ChaCha Search, Inc. (online), http://www.chacha.com/, 3 pages [Accessed May 8, 2015].

(Continued)

*Primary Examiner* — Kakali Chaki
*Assistant Examiner* — Kevin L. Smith
(74) *Attorney, Agent, or Firm* — Perkins Coie LLP

(57) ABSTRACT

Technology is directed to text message based concierge services ("the technology"). A user interacts with a concierge service (CS) via text messages to obtain a specific concierge service. For example, the user can send a text message to the CS, e.g., to a contact number provided by the CS, requesting for a recommendation of a restaurant, and the CS can respond by sending the recommendation as a text message. The CS determines a context of the request and generates recommendations that are personalized to the user and is relevant to the context. The CS can use various techniques, e.g., artificial intelligence, machine learning, natural language processing, to determine a context of the request and generate the recommendations accordingly. The CS can also receive additional information from a person associated with the CS, such as a concierge, to further customize or personalize the recommendations to the user.

27 Claims, 8 Drawing Sheets

(56) References Cited

OTHER PUBLICATIONS

ChaCha, Android Apps on Google Play (online), https://play.google.com/store/apps/details?id=com.chacha.gogreen&hl=en, 2 pages [Accessed May 8, 2015].

Jarvis, Texting Robot, Android Apps on Google Play (online), https://play.google.com/store/apps/details?id=com.demarco.jarvis&hl=en, 3 pages [Accessed on May 8, 2015].

Jarvis, Your SMS Personal Assistant (online), http://jarv.co/, 3 pages [Accessed on May 8, 2015].

* cited by examiner

TEXT-MESSAGING BASED CONCIERGE SERVICES

CROSS-REFERENCE TO RELATED APPLICATION(S)

This application claims the benefit of U.S. Provisional Application Ser. No. 61/974,363 titled "TEXT-MESSAGING BASED CONCIERGE SERVICES" filed Apr. 2, 2014, which is incorporated herein by reference for all purposes in its entirety.

BACKGROUND

Current concierge service providers (CSPs) use various media to provide concierge services, e.g., website, email, telephone, physical offices, etc. However, the current CSPs lack efficiency, e.g., in terms of time, accuracy, ease of access, resources required by the users to access the CSPs, etc. For example, to obtain services from a CSP who is accessible online, a user needs to have access to Internet. In another example, to obtain services from a CSP who is accessible via email, the user needs to have access to the Internet. Further, email is not an effective medium for conducting communications that need a quick response. Some studies suggest that the percentage of emails that are reportedly read within a few minutes of receipt are significantly less, and therefore fail to prompt the individuals to respond. In yet another example, to obtain services from a CSP who has a physical presence, e.g., an office, the user needs to visit the CSP's office physically to avail the services. Visiting the CSP's office can not only be time consuming for the user, can also be impractical, especially if the CSP's office is not in a location convenient to the user.

While it is possible to find a great French restaurant, with outdoor seating, for under $60 dollars, using the current CSPs, it can require the user to sift through pages of reviews on social discovery applications, such as Yelp by Yelp of San Francisco, Calif., or bookmarking articles in "best of" magazines, or have long phone calls with CSPs, all of which can consume time and be tedious for the user.

Further, the search results provided by the current social discovery applications for a particular service, e.g., restaurants, lack personal context. They are more of results of a query to a database than recommendations. Some applications provide a number of filters or search criteria using which the user can obtain more relevant results. The search criteria is typically limited to few common known ones, such as, a restaurant name, cuisine, distance, cost. Such search criteria barely provides personalized results. Further, in spite of using such search filters, the number of search results retrieved can be quiet large, which may not be helpful as the user has to review the large number of search results to find a suitable service and which can consume time and be tedious for the user. The search results provided may not be personalized or customized for a specific user. The current social discovery applications lack the capabilities to understand the context of the request. For example, if a user is interested finding a perfect restaurant for a first date, the social discovery applications may not be able to support such requests.

DETAILED DESCRIPTION

Figure 1:
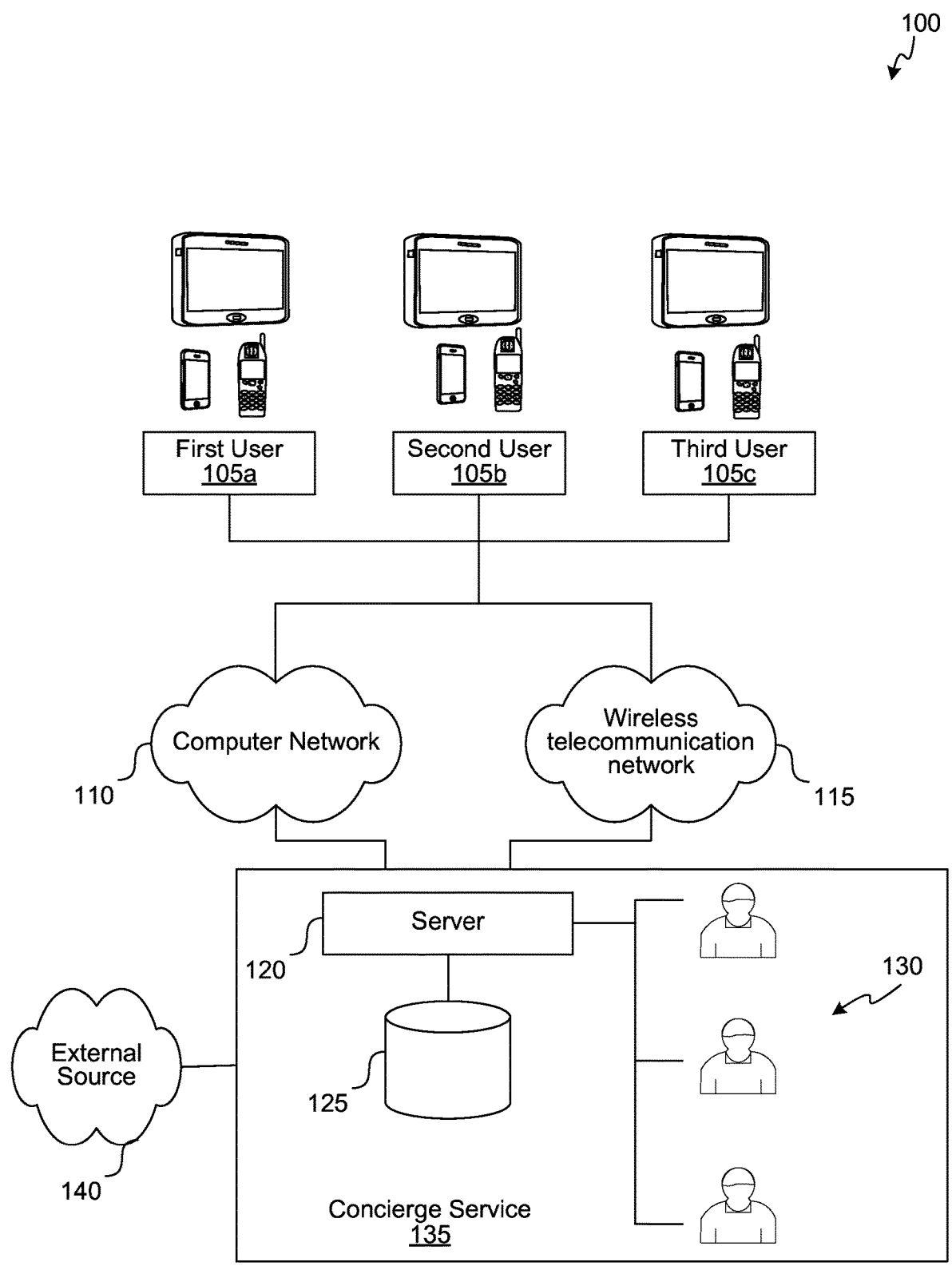
FIG. 1 is a block diagram illustrating an environment in which the text message based concierge services can be implemented.

Introduced here is technology for a text message based concierge services ("the technology"). The text message based concierge service (CS) can provide recommendations for a service and/or a product ("service") to a user. In some embodiments, the user can interact with the CS via one or more text messages to obtain recommendations. For example, the user sends a text message to the CS requesting for a recommendation of a restaurant and the CS responds by sending the recommendation via a text message. The interaction between the CS and the user can include multiple text messages exchanged between the user and the CS, e.g., text messages from a user specifying user preferences and text messages from the CS to the user requesting user preferences.

In some embodiments, the user can interact with the CS via short text messages using a mobile computing device, for example, by using short messaging service (SMS) provided by a wireless telecommunication network of the mobile computing device. In some embodiments, the text messages can also be multimedia messages, e.g., a picture message, and can be sent to the mobile computing device of the user using messaging services provided by the wireless telecommunications network such as multimedia messaging service (MMS) or the like. The text messages can also be sent via a computer network such as Internet, for example, by using a social networking application, e.g., WhatsApp by Facebook of Menlo Park, Calif. A mobile computing device can include a mobile phone, a smartphone, a tablet, a laptop or other computing devices that are capable of sending and receiving text messages.

The CS provides a convenient and quick way for a user to obtain various concierge services. The user can start using the services of the CS with little or no initial set up time. For example, the user does not have to download any application ("app") and/or create any user account with the CS to obtain the services from the CS. The user sends a text message to an identification, e.g., a telephone number, associated with the CS, e.g., via SMS, on the mobile phone, and receives the response from the CS via a text message. Also, in some embodiments, the user can use an application, such as WhatsApp, that does not require the user to create any user account to send and receive text messages to/from the CS.

The CS provides various concierge services, including recommendations to a service and/or a product. For example, the recommendations can include recommendations for a restaurant, a plumber, dry cleaners, etc. The CS also performs various tasks for the user, e.g., making a reservation for a restaurant, having food delivered to the user, making an appointment with a hair stylist, buying movie tickets, booking a taxi.

The CS includes a server computing device ("server") that processes the text messages received from the users to provide the concierge services, e.g., generates recommendations for a requested service. The server can analyze the text messages received from the user to determine a context of the request, including various user preferences of the user, and generate the recommendations that are customized to the user. In some embodiments, generating the recommendations for a particular service includes performing a search for the particular service based on the context, selecting at least a subset of the search results and sending the selected subset as recommendations to the user via one or more text messages. In some embodiments, the context includes parameters that indicate user preferences for a particular service for a particular user, information associated with the particular service, user habits based on previous interactions with the CS, or any information that can be used to generate a recommendation that is customized to the user for the particular request.

The CS can be implemented in various configurations. In some embodiments, the generation of the recommendation by the CS is entirely automated, e.g., performed by the server. The server can use various techniques to determine the context of the request. For example, the server can use natural language processing (NLP) techniques to analyze the text messages, e.g., to determine words in the text messages indicating user preferences. In another example, the server can use artificial intelligence (AI) or machine learning techniques to determine the context of the request based on the information provided by the user in the text messages.

In some embodiments, the CS is implemented as a human-powered CS. In the human-powered configuration, the generation of the recommendation, though automated, can be revised by a user associated with the server, such as a concierge. The concierge can analyze the text messages received from the user to determine additional parameters required for customizing the recommendation and provide the additional parameters to the server to be used in generating the recommendations. The additional parameters can be in addition to the context parameters determined by the server. For example, the concierge may know of some information about a city where the user is requesting for a recommendation for a restaurant, and the concierge can input such information to the server, which can then include the input information in performing the search. In another example, the concierge can instruct the server to send one or more text messages to the user seeking additional information.

In some embodiments, by using the human-powered configuration of the CS, the CS server can provide recommendations that are more customized and/or personalized to the user and that has a higher likelihood of being accepted the user in comparison to a huge list of search results provided by current applications, e.g., social discovery applications, that are not personalized to the specific user.

Environment

FIG. 1 is a block diagram illustrating an environment 100 in which the text message based concierge services can be implemented. The environment 100 includes a server 120 that provides a text messaging infrastructure for the concierge service 135 (CS 135) to exchange text messages related to concierge services with one or more users of the concierge service, such as a first user 105a, a second user 105b and a third user 105c. A user, e.g., first user 105a, can interact with the CS 135 via text messages to obtain a concierge service. The text messages can be exchanged via various communication networks. For example, the CS 135 can send and receive a text message as an SMS or MMS via a wireless telecommunication network 115, e.g., of a mobile computing device of the user. In another example, the CS 135 can send and receive a text message over a computer network 110, e.g., Internet, via applications such as WhatsApp.

The user can send a text message requesting a concierge service, e.g., recommendations for a particular restaurant, to the CS 135, e.g., to a telephone number provided by the CS 135. The CS 135 receives the text message, analyzes the text message to determine a context of the request, performs a search at various sources, e.g., from a database 125 that stores information of various service providers and/or an external source 140, to obtain a list of results for the requested service, and sends at least a subset of the results as a recommendation to the first user 105a via a text message. The external source 140 can be any source in a computer network, e.g., Internet, from which information for the requested source can be obtained. In some embodiments, the CS 135 exchanges multiple text messages with the first user 105a, e.g., in order to determine the context of the request, such as user preferences, to provide recommendations that is more personalized to the first user 105a. The first user 105a can send and receive the text messages using a variety of mobile computing devices, e.g., a smartphone, a mobile phone, a tablet, a laptop.

An example of a concierge service provided by the CS 135 can include recommendation of restaurants. The first user 105a sends a text message requesting the CS 135 to provide recommendation for a particular restaurant of a particular cuisine. The user can also include other preferences such as a preferred location, time of the day, an ambience, etc., in the request. In some embodiments, the first user 105a can also include other contextual information, such as that the user is going out on a first date. The user can send the above information as one or more text messages. The server 120 receives the text messages and analyzes the text messages to determine a context of the request, e.g., a set of parameters that can be used by the server 120 to generate recommendations that are customized to the user.

Some of the set of parameters can be explicit and some of them can be implicit. In some embodiments, explicit parameters are the parameters provided in the text messages by the first user 105a. For example, a cuisine, a desired location of the restaurant, and a price range, mentioned in the text messages by the first user 105a are explicit parameters. In some embodiments, implicit parameters are the parameters derived by the CS 135 based on the information provided in the text messages. For example, information such as a restaurant type, e.g., "fine dining," which is not provided by the first user 105a but derived based on other contextual information, e.g., "going out on a first date," can be an implicit parameter. In another example, implicit parameters can also include information that is derived from user habits data. In some embodiments, user habits data includes information regarding the user and the interactions the user had with the CS 135 for previous requests, e.g., user preferences mentioned in the previous requests, recommendations the user accepted and/or rejected, reasons for accepting and/or rejecting the recommendations.

The server 120 can analyze the text messages to extract the explicit parameters from the text messages provided by the first user 105a and determine the implicit parameters based on the information provided in the text messages. In some embodiments, the server 120 determines whether the number of parameters determined satisfy a criterion for generating the recommendations. For example, the criterion is based on a number of the parameters, where the criterion is satisfied if the number of parameters exceeds a specified threshold. In another example, the criterion is based on a number of search results retrieved based on the determined parameters, where the criterion is not satisfied if the number of search results is below a specified threshold. Other criteria may be defined to determine whether the set of parameters determined satisfy a criterion for generating recommendations that are customized to the user. If the number of parameters do not satisfy the criterion for generating the recommendations, the server 120 sends one or more text messages to the first user 105*a* seeking additional information for servicing the request. The server 120 and the first user 105*a* continue exchanging messages, e.g., for the CS 135 to determine additional parameters, until the CS 135 determines that the number of parameters satisfies the criterion.

After the CS 135 determines that the set of parameters satisfy the criterion, the CS 135 performs a search for the restaurants using the set of parameters at various sources, e.g., the database 125, external sources 140. The database 125 can store various information, e.g., service provider information, a user profile of a user that includes user preferences, user habits data, and. The external source 140 could be any source, including third party databases and/or search engines that can be accessed via the Internet. The CS 135 retrieves the search results and selects one or more of the results, e.g., one two or three results, and sends them as a recommendation to the first user 105*a* via one or more text messages to a mobile device of the first user 105*a*. The recommendation can include information such as a name of the restaurant, address, contact number, email ID, user rating, a picture of the restaurant and/or a popular dish at the restaurant. In some embodiments, the recommendation can also include other information, e.g., a reason why the restaurant is recommended to the first user 105*a*, trivia about the restaurant.

The CS 135 can be configured in various ways to provide recommendation to the users. In a first configuration, the CS 135 can have personnel such as concierges 130 who obtain the information requested by the user from various sources and provide recommendations. In a second configuration, the server 120 obtains the information requested by the user automatically and without any intervention by the concierges 130 and generates the recommendations. In a third configuration, the CS 135 can use both the server 120 and the concierges 130 to provide the recommendations to the user automatically. Each of the above configurations is described in further detail in the following paragraphs and at least with reference to FIG. 2.

Figure 2:
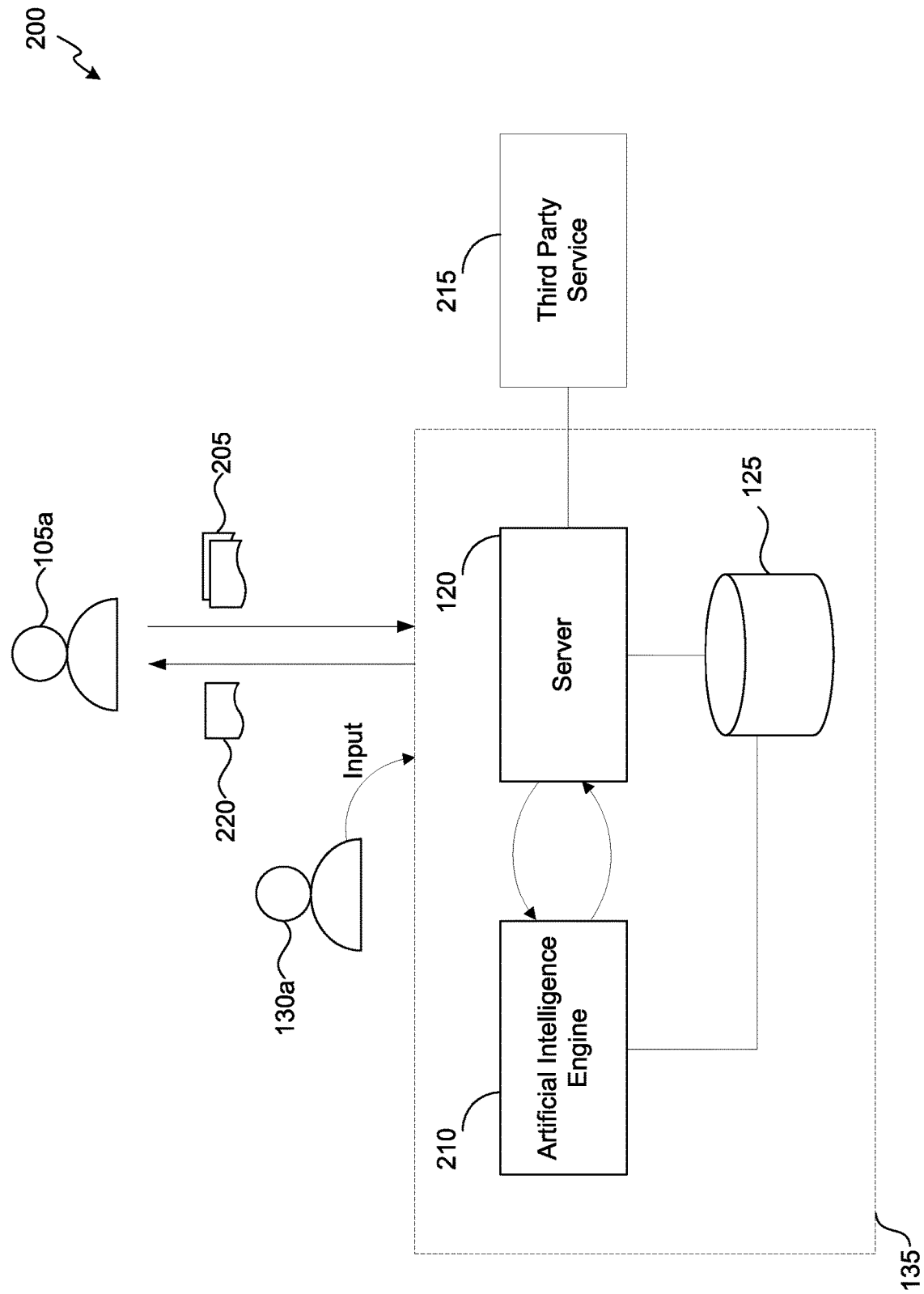
FIG. 2 is a block diagram of the concierge service (CS) of FIG. 1, consistent with various embodiments.

FIG. 2 is a block diagram 200 of the concierge service of FIG. 1, consistent with various embodiments. The server 120 facilitates the generation of the recommendations for a service requested by the users, e.g., first user 105*a*. Referring back to the first configuration, the server 120 receives text messages 205 from the first user 105*a* containing a request for recommendation for a particular service. One of the concierges 130, e.g., concierge 130*a*, analyzes the text messages 205 to determine a context of the request, e.g., a set of parameters specified by the first user 105*a* in the text messages 205 regarding the requested service. For example, the request can be for providing recommendation for restaurants, and can include parameters such as a particular cuisine, a preferred location, time of the day, etc. The concierge 130*a* identifies the parameters of the request from the text messages 205. If the concierge 130*a* determines that the set of parameters are not sufficient for generating recommendations that are customized to the first user 105*a*, the concierge 130*a* can instruct the server 120 to send text messages to the first user 105*a* requesting additional information regarding the requested service.

After obtaining the set of parameters, the concierge 130*a* can search various sources, e.g., the database 125 or external sources 140 using the server 120, to obtain a list of the restaurants based on the set of parameters. The database 125 can store information regarding various service providers. For example, the database 125 can store information such as a name of the service provider, address, contact number, email ID, user rating, a picture of a product or service provided by the service provider, current offers provided by service provider, pricing details of the product or the service, etc. The external source 140 can include third party databases, services and/or search engines and can be accessed via a communication network, e.g., Internet.

In some embodiments, the concierge 130*a* can further refine the list of restaurants obtained based on various parameters, e.g., user habits data, other parameters based on his/her personal knowledge regarding the type of service requested. For example, if the concierge 130*a* knows that a set of restaurants from the list are in a location that has heavy traffic or a public transit system, e.g., trains, in and out of the location are currently suspended, the concierge 130*a* can modify the query to exclude the set of restaurants from the location.

After obtaining the refined list, the concierge 130*a* can then select a particular restaurant from the refined list. In some embodiments, the selection of a particular restaurant from the refined list by the concierge 130*a* for recommendation to the first user 105*a* can be based on a personal opinion of the concierge 130*a* about the particular restaurant, or on concierge's knowledge about how other users received the recommendation of the particular restaurant, etc. In some embodiments, when the server 120 returns the list of restaurants, the list can be sorted based on a specific criterion, e.g., based on a distance of restaurants from the first user 105*a*, user ratings, etc. The concierge 130*a* may also customize the sorting of the list.

After selecting a particular restaurant from the list, the concierge 130*a* can recommend the restaurant to the first user 105*a* via a text message 220 to a mobile device associated with first user 105*a*. The first user 105*a* may reply back to the concierge if he/she is not satisfied with the recommendation, and can further specify why they are not satisfied. The first user 105*a* can also specify additional preferences. The concierge 130*a* can revise the search and send another recommendation to the user based on the user's response. In some embodiments, the interaction between the concierge 130*a* and the first user 105*a* can continue until the user has obtained a satisfactory recommendation.

In some embodiments, the first configuration of the CS 135 may have a scalability problem. For example, the number of concierges 130 required to provide recommendations to the users can increase as the number of users using the service increase, which may not be feasible.

Referring back to the second configuration, the recommendation process can be automated and the CS 135 can provide the recommendations to the user automatically and without the intervention of the concierges 130. The server 120 can analyze the received text messages 205 to determine the context of the request. In some embodiments, determining the context of the request includes determining a set of explicit parameters of the request, e.g., parameters specified in the request, and determining a set of implicit parameters, e.g., parameters derived based on the information provided in the text messages 205. The server 120 uses various techniques to determine the context of the request. In some embodiments, the CS 135 includes an AI engine 210, which uses techniques such as AI, NLP and/or machine learning, to determine the context of the request.

In some embodiments, NLP is related to the area of human-computer interaction, and is a field of computer science, AI, and linguistics concerned with the interactions between computers and human (natural) languages. NLP involves natural language understanding, that is, enabling computers to derive meaning from human or natural language input. In some embodiments, NLP algorithms are based on machine learning, which uses general learning algorithms to automatically learn rules through the analysis of large corpora of typical real-world examples. A corpus is a set of documents (or sometimes, individual sentences) that have been hand-annotated with the correct values to be learned. Some of the tasks performed using NLP include direct real-world applications, e.g., automatic summarization of text, machine translation, named entity recognition, natural language understanding, information retrieval, information extraction.

In some embodiments, AI is the intelligence exhibited by machines or software. It is an academic field of study which studies the goal of creating intelligence. Some traits for AI can include deduction, reasoning and problem solving. Some examples of applications using AI include search and optimization, representing logic, probabilistic methods for reasoning, statistical learning methods.

In some embodiments, machine learning explores the construction and study of algorithms that can learn from data. Such algorithms operate by building a model from example inputs and using that to make predictions or decisions rather than following strictly static program instructions. In some embodiments, machine learning is employed in a range of computing tasks where designing and programming explicit, rule-based algorithms is infeasible. Example applications include spam filtering, optical character recognition, search engines and computer vision.

Referring back to the AI engine 210, the AI engine 210 can analyze the text messages 205 to extract the explicit parameters from the text messages 205. For example, explicit parameters can include information such as a cuisine, a desired location of the restaurant, a price range, mentioned in the text messages 205 by the first user 105*a*. The AI engine 210 can analyze the text messages 205 to determine the implicit parameters. For example, information such as a restaurant type, e.g., "fine dining," which though not provided by the first user 105*a* in the text messages 205, is derived based on other contextual information, e.g., "going out on a first date" provided in the text messages 205 can be an implicit parameter. In some embodiments, implicit parameters can include parameters associated with the particular service. For example, if the first user 105*a* has requested for recommendations for a restaurant in a particular city, the AI engine 210 can consider information associated with the particular city, such as traffic in certain parts of the city, road closures due to special events, suspension of public transports, special events in the particular city as implicit parameters. In some embodiments, such information can be provided by a third party service 215. The third party service 215 can include one or more servers that are accessible to the server 120 via a communication network, e.g., Internet. The server 120 can communicate with the third party service 215 via an application programming interface (API) of the third party service 215.

The implicit parameters can also include information that is derived from user habits data. In some embodiments, user habits data includes information regarding the user and/or the interactions of the user with the CS 135 that is gathered by the server 120 in previous requests from the user. The user habits data can include user preferences specified by the user or derived by the server 120 in the previous requests. The user habits data can include recommendations the user accepted and/or rejected and a reason for accepting and/or rejecting the recommendations.

The server 120 performs a search using the determined set of explicit and implicit parameters at various sources, e.g., database 125 and/or external source 140, to obtain a list of the restaurants. The server 120 can use some or all of the determined parameters to perform a search for obtaining the list of restaurants. The server 120 can select a subset of the restaurants from the list, e.g., if number of restaurants in the list exceeds a specified threshold. In some embodiments, the AI engine 210 can facilitate the server 120 to select the subset based on one or more the determined parameters. The AI engine 210 can various other analytics such as a user selection pattern of the particular service providers. For example, the AI engine 210 can determine a set of restaurants form the list based on the number of times a recommendation for a particular restaurant is accepted by the first 105*a* user and/or other users, number of users who accepted the recommendation for the particular restaurant, the frequency at which a particular restaurant is recommended by the server 120 for a particular cuisine, location, or ambience, etc.

After selecting a subset from the list, the server 120 can send a recommendation of one or more restaurants from the subset to the first user 105*a* via a text message 220. The first user 105*a* may reply back accepting the recommendation or asking for more recommendations. In some embodiments, the first user 105*a* can further specify additional preferences in the reply. The server 120 can send another set of restaurants from the list or perform a search again to obtain a new set of restaurants based on the additional preferences in the reply received from the first user 120*a*. In some embodiments, the interaction between the server 120 and the first user 105*a* can continue until the user has obtained a satisfactory recommendation.

In some embodiments, the second configuration can provide recommendations to the first user 105*a* in a way similar to the first configuration but may not have a scalability problem as the CS 135 can be configured to handle a large number of requests, e.g., by deploying more servers. However, in some embodiments, the second configuration may not be able to use the personal knowledge of a concierge, as described with reference to the first configuration, for providing recommendations, e.g., for refining the list of service providers based on the personal knowledge of the concierge or for determining some of the implicit parameters.

Referring back to the third configuration, the CS 135 is implemented as a human-powered CS, in which a combination of the server 120 and a concierge, e.g., the concierge 130*a*, can be used to provide the recommendation services to the user. In this third configuration, the generation of the recommendation is automated, that is, the server 120 generates the recommendations like in the second configuration. However, the generation process can be revised by the concierge 130*a*, to provide recommendations that are more customized or personalized to the user. The concierge 130*a* can analyze the text messages 205 to determine the context of the request more accurately, and determine the recommendations that are more relevant to the context.

In some embodiments, the concierge 130a can add parameters to or modify some of the parameters of the set of parameters determined by the AI engine 210 for customizing the recommendation. Continuing with the above example of the AI engine 210 determining a restaurant type as "fine dining" based on contextual information, such as "going out on a first date" provided in the text messages 205, the concierge 130a may add an additional parameter such as an expected wait time to be lesser than a specified threshold to the set of implicit parameters. In another example, if the first user 105a has requested for the recommendation of a restaurant on a game day, the concierge 103a can add the restaurant type as "sports bar," to the implicit parameters. In yet another example, the concierge 103a may know of some information about a city where the user is requesting for a recommendation for a restaurant, e.g., public transport being suspended to a particular location, and the concierge 130a can input such information to the server 120, which can then generate an additional parameter such as "exclude restaurants in street/city/zip code" as an implicit parameter.

In another example, if the concierge 130a needs specific information from the first user 105a, the concierge 130a can instruct the server 120 to send one or more text messages to the first user 105a seeking the specific information.

In some embodiments, after the server 120 determines a list of restaurants, e.g., as described with reference to the second configuration, the server 120 can filter the list of restaurants based on data received from the concierge 130a. The data received from the concierge 130a can be based on his/her personal knowledge of the user, the service, and/or based on the user habits data. For example, if the concierge 130a knows from the text messages that the first user 105a is visiting a particular city for the first time, the concierge 130a can instruct the server 120 to send a specific restaurant from the list that is indicated as a must visit for first time travelers. In another example, if the concierge 130a determines that the list includes one or more recommendations similar to the ones the user has rejected previously, the concierge 130a can instruct the server 120 to remove the restaurants from the list.

Accordingly, the third configuration by receiving an input from a concierge 130a enables providing recommendations to a user that are further personalized or customized to the user and that can be more relevant to the context of the request. Also, in some embodiments, since the third configuration can work automatically and the role of the concierges 130 in the third configuration is limited as compared to the second configuration, the CS 135 may not have the scalability problem the first configuration may have. In some embodiments, the third configuration provides a combined advantage of the first configuration and the second configuration, while minimizing the disadvantages associated with the first configuration and the second configuration. For example, the third configuration, like the first configuration, can provide recommendations that can be more personalized than the second configuration, and like the second configuration, can be more scalable than the first configuration.

The CS 135 provides a user interface that the service providers, e.g., entities associated with external source 140, can use to register themselves with the CS 135. The service providers can provide their profile information, including a service or product type or a category, a name, address, contact information, website URL, or any other detail that can help in identifying the service provider. The service providers can also provide additional details such as pricing details of the products/services, pictures of their products or services, client testimonials, etc.

The CS 135 can provide various concierge services. Some example concierge services include recommending restaurants, grocery stores, apparel stores, limousine services, taxi services, plumbing services, florists, night life hot spots. Some other examples of the concierge service include performing tasks for the users, e.g., making restaurant reservations, ordering and delivery of food, making travel reservations including air, booking a taxi, water and road, tours of local attractions, arranging for spa services, procurement of tickets to special events. The above concierge services are illustrative, and the CS 135 is not limited to the above examples. The CS 135 can be used to provide any type of concierge service that can be accomplished by interacting with the user via text messages.

In some embodiments, the CS 135 can use third party services 215 for performing the above tasks. For example, for booking a taxi, the CS 135 can use a third party service that provides taxi booking services. In another example, for delivering food, the CS 135 can use a third party service that provides food delivery services. The CS 135 can provide an API which can be used by a third party service to integrate with the CS 135. Alternatively, the CS 135 can use the API of the third party service to perform the task.

Note that the CS 135 can include more components than illustrated in the environment 100 in the block diagram 200. In some embodiments, there can be more than one server. For example, there can be one or more servers for receiving texts, one or more for sending texts and one or more for allowing the service providers to register themselves. The CS 135 can have one or more servers for handling billing and payments from the service providers. The AI engine 210 can be integrated within the server 120 or be separate from the server 120. Further, the AI engine 210 can be implemented in a distributed configuration, where different computers perform different functionalities of the AI engine 210.

Figure 3:
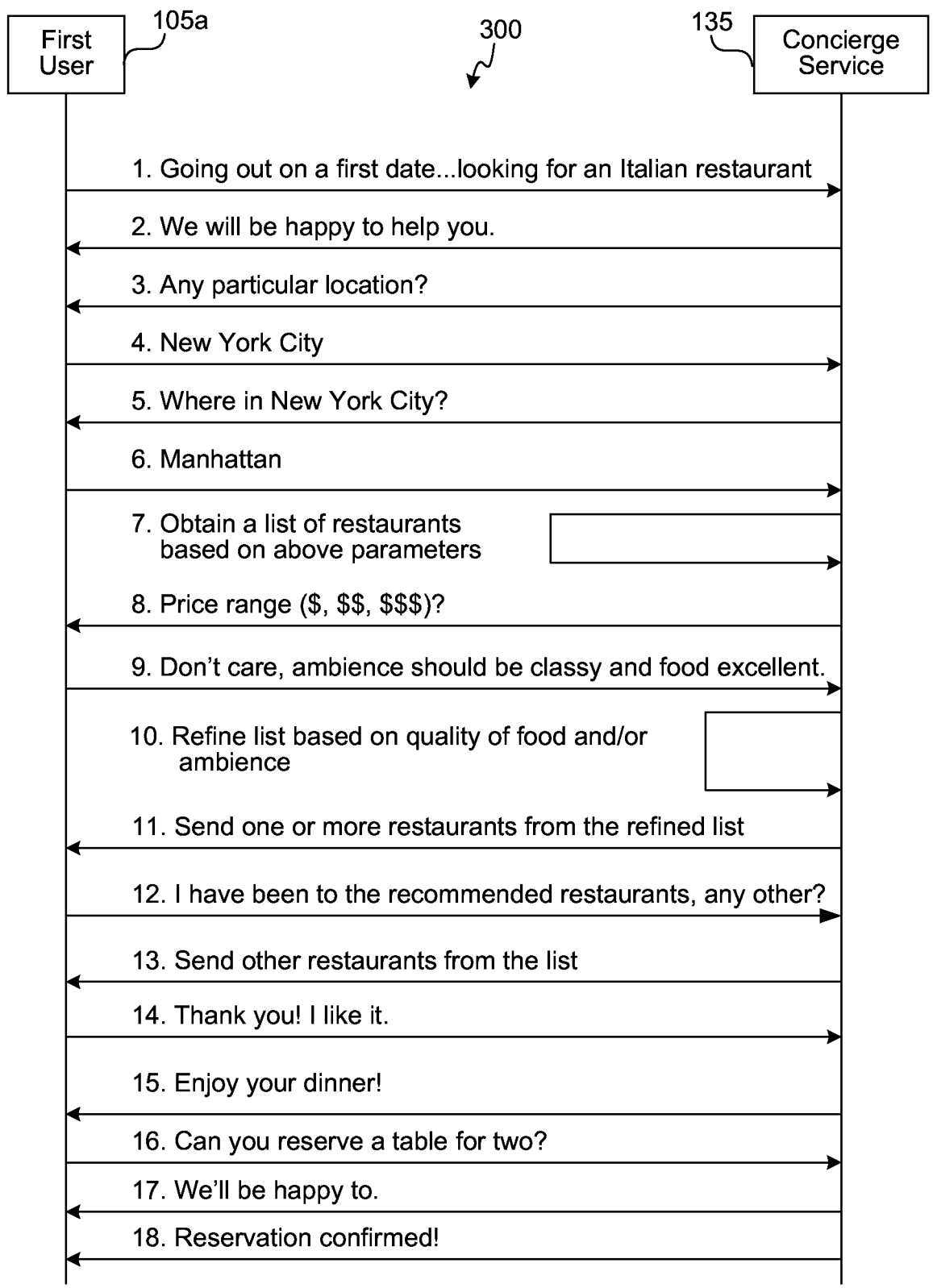
FIG. 3 is a sequence diagram illustrating an example of an interaction between a user and the CS of FIG. 1 for providing a recommendation of a particular service, consistent with various embodiments.

FIG. 3 is a sequence diagram illustrating an example of an interaction 300 between a user and the CS of FIG. 1 for providing a recommendation of a particular service, consistent with various embodiments. The interaction 300 can occur in the environment 100 of FIG. 1. Further, consider that the CS 135 is implemented using the third configuration, as described above at least with reference to FIG. 2. In some embodiments, providing a specific concierge service to the user can be an interactive process. The interactive process can involve exchanging multiple text messages between a user, e.g., first user 105a, and the CS 135 for arriving at a recommendation for the specific service. In the interaction 300, the first user 105a requests the CS 135 to recommend a restaurant. In some embodiments, the first user 105a sends and/or receives text messages using a mobile computing device such as a mobile phone.

In some embodiments, a text message can be of three types—(i) information-only type: a text message that does not require a response from the first user 105a and/or the CS 135, e.g., a thank you message, (ii) response type: a text message that requires an answer from the first user 105a and/or the CS 135, e.g., "what is your preferred location?," and (iii) "Open Ended" type: a text message for which the first user 105a may or may not reply and if the first user 105a replies, the response may be considered by the CS 135 for providing the recommendation, e.g., "Is it a special dinner?".

At interaction 1, the first user sends a text message to the CS 135 requesting a recommendation for an Italian restaurant for his/her first date. At interaction 2, the CS 135 can send a text message acknowledging the receipt of the request from the first user 105a. For example, the CS 135 can send a text message saying "We will be happy to help you." The CS 135 can analyze the text message received from the first user 105a to determine a context of the request. In some embodiments, determining the context of the request can include determining a set of parameters of the request that can be used to generate recommendations that are personalized to the user and that is relevant to the context of the request. The CS 135 analyzes the text message received from the first user 105a to determine a set of parameters. The CS 135 determines that the set of parameters do not satisfy a criterion for generating the recommendations. For example, the server 120 of the CS 135 can determine that the set of parameters do not satisfy a criterion for generating the recommendations.

At interaction 3, the CS 135 can send a text message seeking additional information from the first user 105a, e.g., a particular location the first user 105a is interested in.

At interaction 4, the CS 135 can receive a text message from the first user 105a having the requested information. For example, the first user 105a sends the location information as "New York City". The CS 135 can analyze the text message and determine that the information is still not enough to provide a relevant and useful recommendation to the user. For example, the CS 135 determines that "New York City" is a large city and therefore, a location of specific part of the city may be required to provide the recommendation.

At interaction 5, the CS 135 can send a text message to the first user 105a asking the first user 105a to provide additional information regarding the location, e.g., a particular location in New York City.

At interaction 6, the CS 135 can receive a text message from the first user 105a that includes the particular location in the city. For example, the first user 105a can send the additional location information as "Manhattan." The CS 135 can continue the interaction until the CS 135 determines that a set of parameters determined from the text messages satisfies a criterion for performing a search. In this interaction 300, the CS 135 determines that the set of parameters satisfy the criterion for performing the search.

At interaction 7, the CS 135 performs a search at various sources, e.g., database 125 and/or external sources 140, using the set of parameters determined from the text messages to obtain a list of restaurants. The parameters can include explicit parameters, such as a cuisine type and a preferred location, that are specified in the text messages received from the first user 105a. In some embodiments, the parameters also include implicit parameters determined based on the information provided in the text messages by the first user 105a. For example, the CS 135 can determine the cuisine type as "fine dining" based on the contextual information "going out on a first date" provided by the first user 105a in the text messages. Typically, people prefer to go to a fine dining on their date rather than fast foods or other restaurants. The AI engine 310 can be configured to deduce that the user may prefer to go a fine dining if they are going on a date. Accordingly, the CS 135 can include "fine dining" as one of the search parameters in obtaining the list of restaurants. The CS 135 can use various other implicit parameters, e.g., parameters that are determined based on user habits data. The user habits data can be user habits data of the first user 105a or of other users who have gone out on a first date. In some embodiments, the CS 135 may use only some of the parameters determined from the text messages, e.g., when the CS 135 determines that the number of search results is less than a specified threshold.

After obtaining the list, the CS 135 can determine that the number of restaurants appearing in the list is significant. Accordingly, the CS 135 determines to refine the list based on additional parameters of the request. In some embodiments, the CS 135 can use some of the parameters, e.g., implicit parameters that are not used in performing the search in interaction 7. In some embodiments, the CS 135 can determine that additional information is needed from the first user 105a in order to make a recommendation that is more relevant to the context of the request.

At interaction 8, the CS 135 sends a text message asking the first user 105a for additional information. For example, the CS 135 can ask if the first user 105a is looking for a restaurant at a particular price range.

At interaction 9, the CS 135 receives a text message from the first user 105a the first user 105a provides additional information. In some embodiments, the first user 105a can provide information that may not be pertinent to the current question from the CS 135 but pertinent to finding the preferred service provider. For example, the first user 105a responds that while he/she does not care about the price (pertinent to last question), he/she is looking for a restaurant that has a "classy" ambience and serves excellent food (not pertinent to last question).

At interaction 10, the CS 135 analyzes the text message and determines at least three additional parameters, e.g., one parameter which indicates that price is not relevant to the first user 105a on a first date, a second parameter which indicates that ambience should be classy and a third parameter which indicates that food should be excellent. The CS 135 can refine the list of restaurants obtained in interaction 7 based on the additional information provided by the first user 105a, e.g., in interaction 9, and/or some of the parameters determined in interaction 7. The CS 135 can refine the list of restaurants based on user habits data. For example, the CS 135 can remove the restaurants from the list that may be rejected by the first user 105a for reasons similar to previous rejections.

At interaction 11, the CS 135 sends a text message to the first user 105a including one or more restaurants from the refined list as a recommendation. The first user 105a receives the text message and determines that he/she is not satisfied with the recommendation. For example, the first user 105a may have already visited the recommended restaurants.

At interaction 12, the CS 135 receives a text message from the first user 105a requesting for a different restaurant. In some embodiments, the text message can also include a reason why the first user 105a rejected the particular recommendation.

At interaction 13, the CS 135 sends a next set of restaurants from the refined list as recommended restaurants to the first user 105a in a text message. The first user 105a receives the text message with the next set of restaurants and determines that he/she is satisfied with the recommendation.

At interaction 14, the CS 135 receives an acknowledgement from the first user 105a. For example, the first user 105a can send a thank you message. In some embodiments, the text message can also include information regarding a particular recommendation the user accepted and the reason why the user accepted the particular recommendation.

At interaction 15, the CS 135 sends a text message thanking the first user 105a for using the CS 135.

At interaction 16, the CS 135 receives a text message from the first user 105*a* requesting the CS 135 to make a reservation for the first user 105*a* at the selected restaurant.

At interaction 17, the CS 135 sends a text message to the first user 105*a* indicating that the CS 135 would make the reservation for the first user 105*a*. For example, the CS 135 sends a message "We'll be happy to" to the first user 105*a*.

At interaction 18, the CS 135 sends a text message to the first user 105*a* confirming the reservation. In some embodiments, the CS 135 can use third party services, e.g., third party service 215, to make the reservation. For example, the CS 135 communicates with the third party service 215 over a communication network, e.g., Internet, using an API published by the third party service 215. In some embodiments, the third party service 215 is a computer application executing on a server to perform a specified task.

The interactions between the first user 105*a* and the CS 135 can continue for a specified period of time, e.g., until the first user 105*a* is satisfied with the service provided, or until the first user 105*a* decides to quit the interactive process.

Note that the text messages are exchanged between the CS 135 and the first user 105*a* using the server 120 and a mobile computing device of the first user 105*a*. Note that the server 120 can use the AI engine 210 to perform various analyses of the text messages exchanged between the CS 135 and the first user 105*a*. For example, the server 120 can use the AI engine 210 to determine at least some of the explicit and implicit parameters. Additionally, the server 120 can use the AI engine 210 to refine the list of restaurants in interaction 10.

In some embodiments, the server 120 can also receive input from a concierge, e.g., concierge 130*a*, in generating the recommendations. The concierge 130*a* can use the analysis performed by the AI engine 210 in determining the explicit and/or implicit parameters and provide additional parameters or modify the determined parameters. For example, if the analysis by the AI engine 210 indicates that the first user 105*a* is looking for a fine dining because he is going on a first date, the concierge 130*a* can determine that the first user 105*a* may not want to go to a restaurant that is usually crowded because of which the first user 105*a* may have to wait a long time. Accordingly, the CS 135 may receive an additional implicit parameter, e.g., crowd level as "low," from the concierge 130*a* as an input. The server 120 may perform one or more of adding the additional implicit parameter to the search criteria, e.g., in interaction 7, refining the list of restaurants to leave out crowded restaurants, e.g., in interaction 10, or recommending one or more restaurants from the list that are not crowded, e.g., in interaction 11. Accordingly, the server 120 can revise the recommendations generated for the first user 105*a* based on the input received from the concierge 130*a*, e.g., in order to generate recommendations that are more personalized to the user and relevant to the context of the request.

Note that the interactions illustrated in sequence diagram may be altered in various ways. For example, the number of interactions for providing a specific service may be greater or less than the number of interactions depicted in the sequence diagram. In another example, the order of the interactions may be rearranged, substeps may be performed in parallel, illustrated interactions may be omitted; other interactions may be included, etc. For example, the interactions 5 and 6 may be omitted if the city is a small city. In yet another example, the interaction process may conclude after interaction 11 if the first user 105*a* is satisfied with the first set of recommendations and the first user 105*a* does not need any assistance with making a reservation. In still another example, the interaction 300 may include additional interactions, e.g., refining the list once more after interaction 12 based on additional user preferences.

A text message can include a specified maximum number of characters. In some embodiments, a text message includes up to 160 characters. In some embodiments, if the number of characters in a text message exceeds the specified maximum number, the text message is split into two or more text messages. In some embodiments, the text messages can be exchanged in various languages. Also, the text messages can be translated into various languages.

Figure 4:
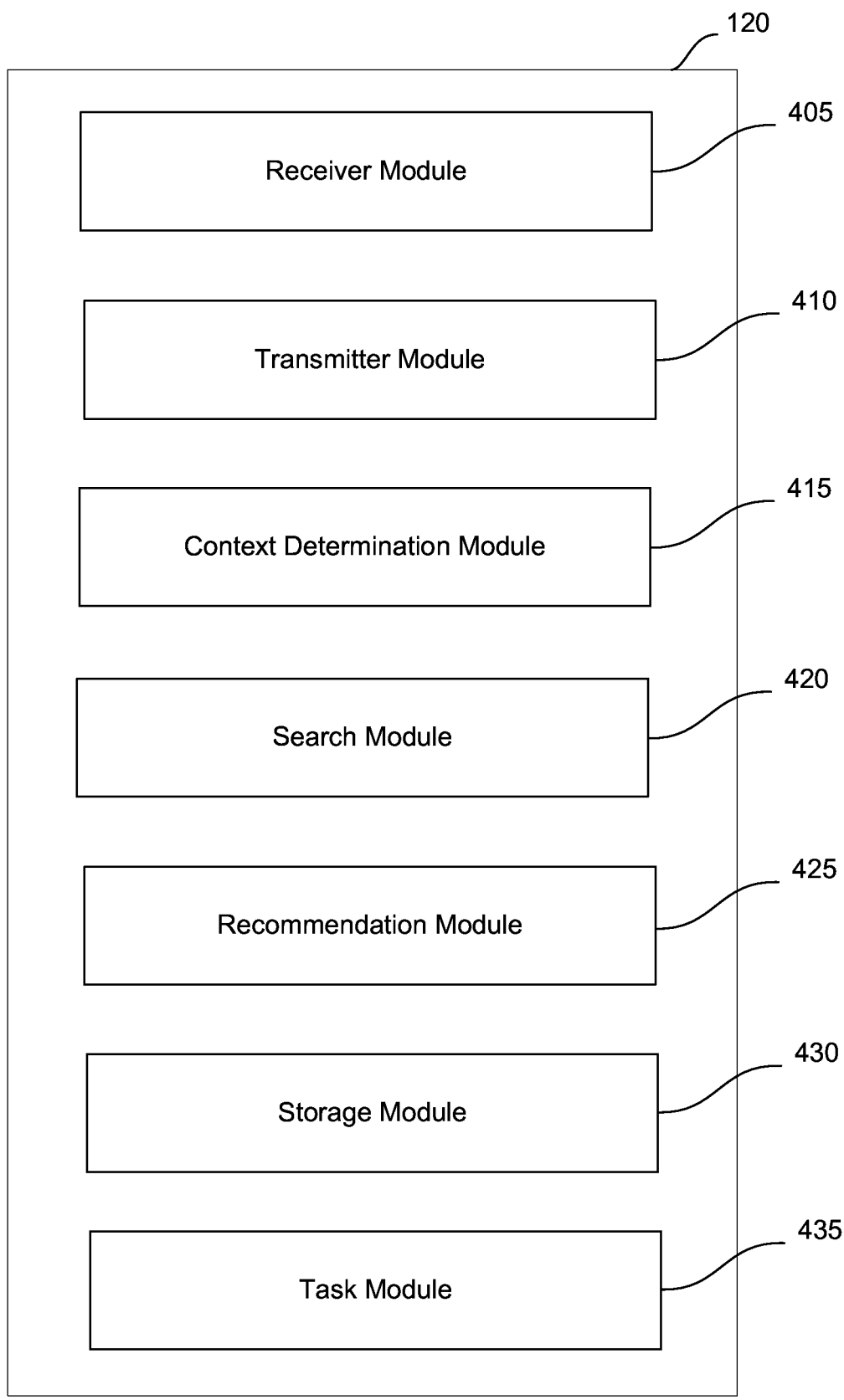
FIG. 4 is a block diagram of the server of FIG. 1, consistent with various embodiments.

FIG. 4 is a block diagram of the server 120 of FIG. 1, consistent with various embodiments. The server 120 can include a receiver module 450 that is configured to receive text messages. For example, the text messages can be sent from users requesting a particular concierge service from the CS 135. The server 120 can include a transmitter module 410 that is configured to transmit text messages to the users, e.g., to mobile computing devices associated with the users. The server 120 can include a context determination module 415 that is configured to determine a context of the request by analyzing the text messages received from a user. In some embodiments, the context determination module 415 determines the context by determining various parameters of the request, e.g., explicit parameters provided by the user in the request and implicit parameters that are derived based on the information provided in the text messages. The context determination module 415 can determine the context using various techniques, e.g., AI, NLP, machine learning. In some embodiments, the context determination module 415 is similar to the AI engine 210 illustrated in FIG. 2.

The server 120 can include a search module 420 to perform a search at various sources for obtaining a list of recommendations for the requested service. The server 120 can include a recommendation module 425 that is configured to select one or more recommendations from the list of recommendations to be recommended to a user. In some embodiments, the recommendation module 425 can communicate with the context determination module 415 and the search module 420 to determine the recommendations to be sent to the user. The transmitter module 410 can send the recommendation selected by the recommendation module 425 to the user as a text message. The server 120 can include a storage module 430 to store various data, e.g., user profile data, user habits data, information regarding third party services, etc., in a storage system, e.g., database 125, associated with the server 120.

The server 120 can include a task module 435 that is configured to perform tasks, such as making a reservation at the selected restaurant, booking a taxi, etc., for a user. In some embodiments, the task module 435 communicates with a third party service, e.g., the third party service 215 using an API of the third party service 215 to perform the task. Additional details with respect to the above modules are described at least in association with FIGS. 5-7.

Figure 5:
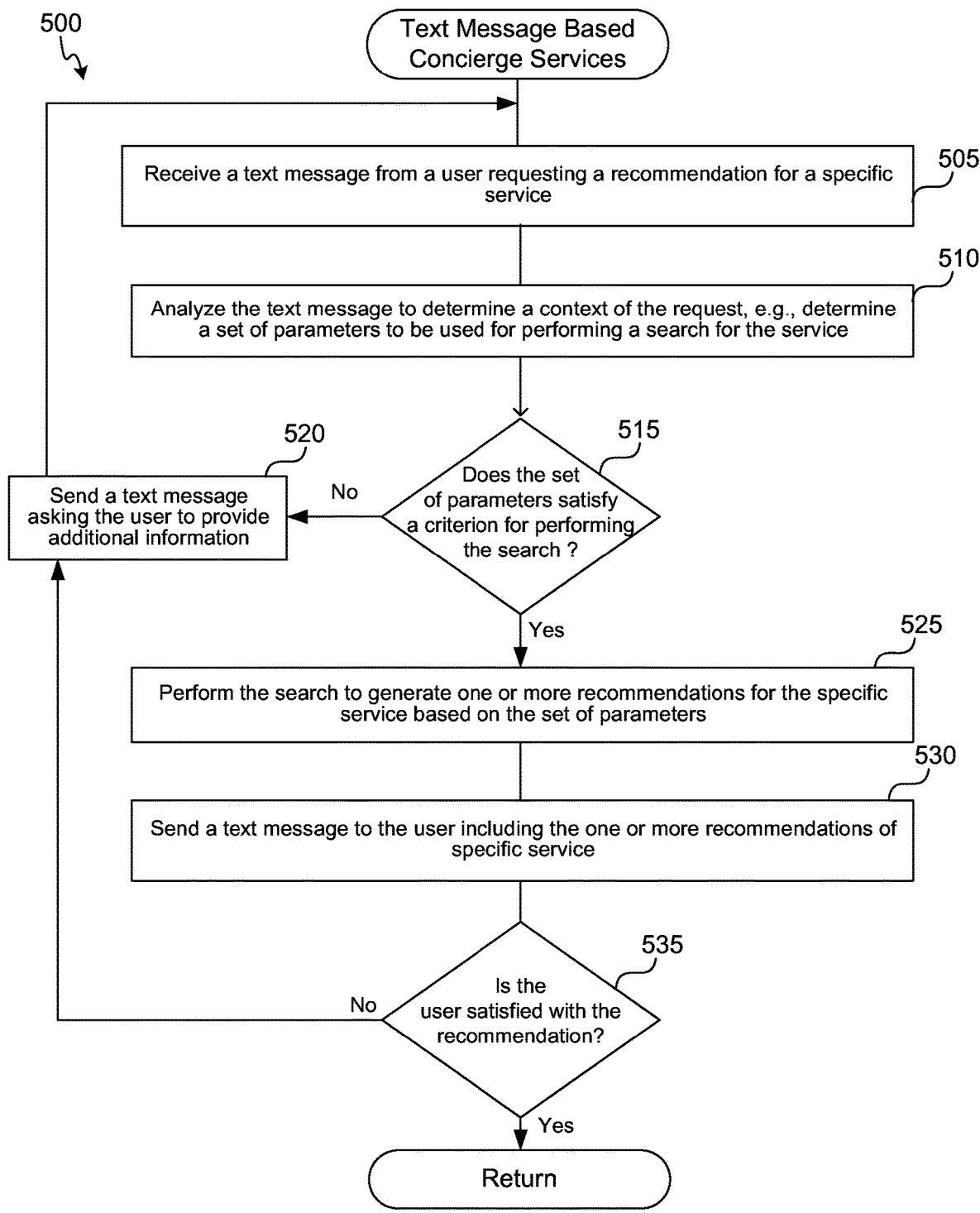
FIG. 5 is a flow diagram a process of providing concierge services to a user via text messages, consistent with various embodiments.

FIG. 5 is a flow diagram a process 500 of providing concierge services to a user via text messages, consistent with various embodiments. In some embodiments, the process 500 may be implemented in the environment 100 of FIG. 1. At block 505, the receiver module 405 of the server 120 receives a text message from a user, e.g., first user 105*a*, requesting a specific concierge service, e.g., recommendation of a restaurant. The first user 105*a* can send the text message to the CS 135 using a mobile computing device associated with the user, e.g., using a messaging service provided by a wireless telecommunications network. The messaging service can be or include SMS, MMS, or another known or convenient messaging service. The text messages can be short text messages or multimedia messages. In some embodiments, the text messages can also be exchanged at least partly via a computer network, e.g., the Internet.

At block 510, the context determination module 415 analyzes the text message to determine a context of the request. In some embodiments, the context determination module 415 determines the context by determining a set of parameters of the request, e.g., explicit parameters provided by the first user 105a in the request and implicit parameters that are derived based on the information provided in the text messages received from the first user 105a. For example, explicit parameters can include a type of the service requested, user preferences for the service mentioned in the text messages received from the first user 105a, etc. In some embodiments, the context determination module 415 can also receive one or more of the set of parameters from a user associated with the CS 135, e.g., concierge 130a. The determination of explicit and implicit parameters is described at least with reference to FIGS. 1-3.

At determination block 515, the context determination module 415 determines whether the set of parameters determined from the text messages satisfy a criterion for performing a search to obtain the list of recommendations. That is, the context determination module 415 determines whether there is enough information to provide a relevant meaningful recommendation. For example, if the request is for a recommendation of a restaurant, the context determination module 415 determines whether information such as cuisine, lunch or dinner, location of the restaurant, etc., are provided by the first user 105a.

In some embodiments, the criterion can include a number of the parameters determined. If the number of parameters determined exceeds a specified threshold, the context determination module 415 can determine that the criterion is satisfied. In some embodiments, the context determination module 415 can also determine whether the criterion is satisfied based on an input provided by the concierge 130a. The concierge 130a can read the text messages and determine whether there is enough information to provide a meaningful recommendation.

Responsive to a determination that the criterion is not satisfied, at block 520, the transmitter module 410 sends a text message to the first user 105a requesting the first user 105a to provide additional information. On the other hand, if the criterion is satisfied, at block 525, the search module 420 performs a search to obtain a list of services that satisfy the set of parameters.

At block 530, the transmitter module 410 sends one or more listings from the list of services as a recommendation to the first user 105a via a text message. In some embodiments, the recommendation module 425 selects one or more listings from the list of services based on one or more of the set of parameters, e.g., determined in block 510. In some embodiments, the recommendation module 425 selects one or more listings from the list of services randomly. Regardless of how the one or more listings are selected, the goal of selecting the one or more listings is for providing a recommendation that is customized to the user and relevant to the context of the request. The determination of one or more recommendations from the list of recommendations is described at least with reference to FIGS. 1-3.

At determination block 535, the recommendation module 425 determines if the first user 105a is satisfied with the recommendation. For example, the context determination module 415 analyzes a response received from the user for the suggested recommendations and determines whether the response indicates a rejection or acceptance of the recommendation by the first user 105a. If the context determination module 415 indicates that the first user 105a is satisfied, the process 500 returns. On the other hand, if the context determination module 415 indicates that the first user 105a is not satisfied, at block 520, the transmitter module 410 sends a text message requesting the first user 105a to provide additional information, and the process 500 proceeds to block 505 to obtain additional information. In some embodiments, after obtaining additional information from the first user, the search module 420 can further refine the recommendations based on the additional information, e.g., as described at least with reference to FIGS. 1-3. In some embodiments, the process 500 can continue to refine the list of recommendations and/or provide different recommendations until the first user 105a is satisfied.

After the first user 105a is satisfied with the recommendation, the first user 105a may make additional requests, e.g., to perform tasks such as making a reservation at the selected restaurant, booking a taxi, etc. The CS 135 also facilitates performing such tasks. The task module 435 can facilitate performing the task for the first user. In some embodiments, the task module 435 communicates with a third party service, e.g., the third party service 215 using an API of the third party service 215 to perform the task.

Figure 6:
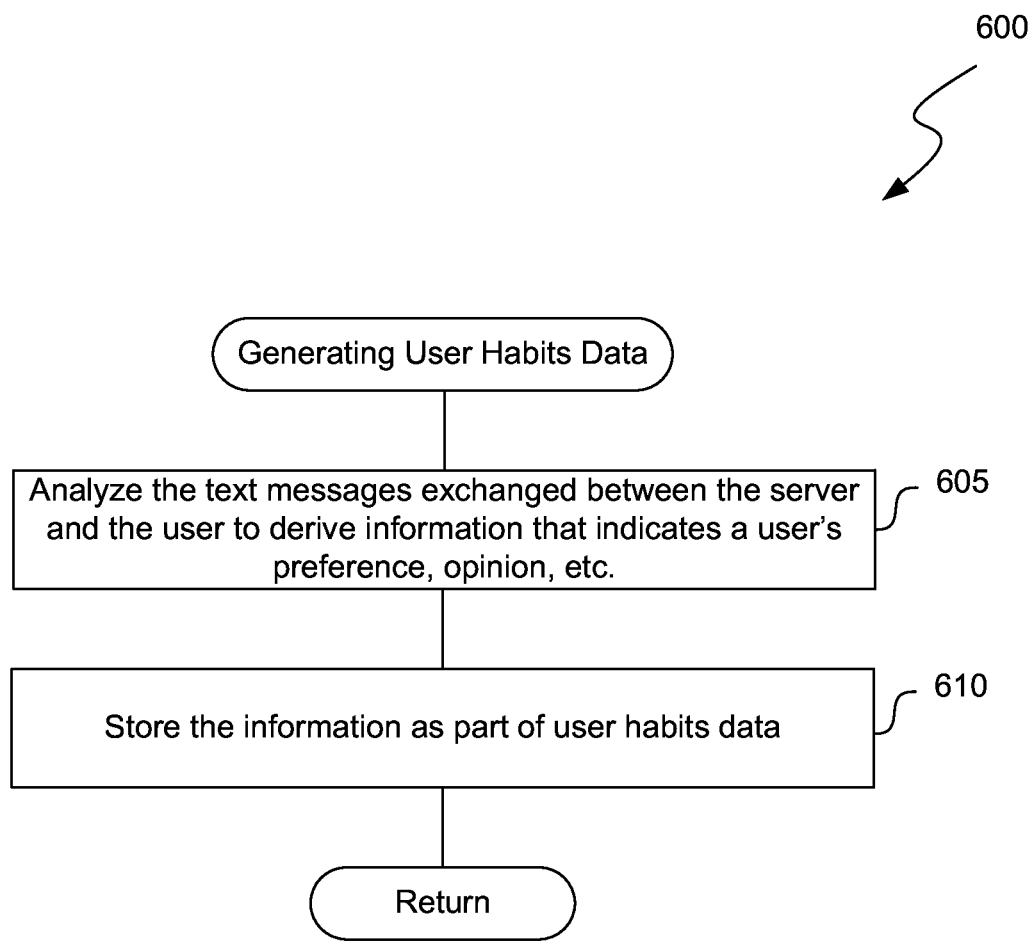
FIG. 6 is a flow diagram of a process for generating user habits data for a user, consistent with various embodiments.

FIG. 6 is a flow diagram of a process 600 for generating user habits data for a user, consistent with various embodiments. In some embodiments, the process 600 can be executed in environment 100 of FIG. 1. In some embodiments, the process 600 can be executed as part of process 500 during an interaction between a user and the CS 135 in which the CS 135 provides recommendations for a specific service requested by a user. At block 605, the context determination module 415 analyzes the text messages exchanged between the server 120 and the user to determine information associated with the user. For example, the information can include a user's preferences for a particular type of service, a price range of the service, preferred locations, a preferred cuisine, an opinion of the user for a particular service, etc. The information can be either provided by the user in the text messages exchanged between the user and the server 120, or can be determined by the server 120 and/or the concierges 130 based on the information provided in the text messages.

The information can also include various other analytics information, such as the preferences of users of a particular age range, income range, ethnicity, a particular location—city, state or country, etc.

At block 610, the storage module 430 stores the information as part of user habits data at a storage system, e.g., database 125, associated with the server 120, and the process 600 returns.

Figure 7:
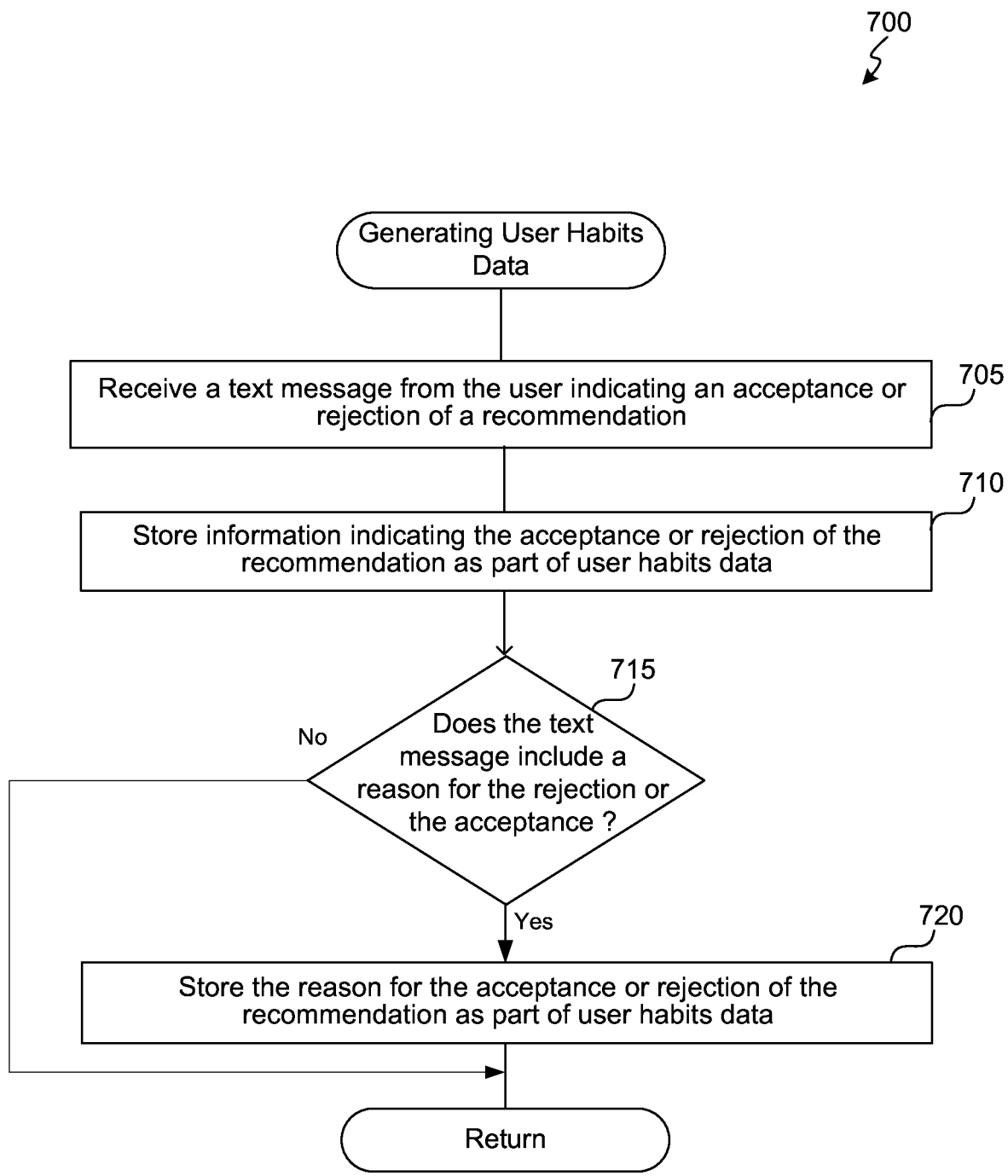
FIG. 7 is a flow diagram of a process for generating user habits data for a user, consistent with various embodiments.

FIG. 7 is a flow diagram of a process 700 for generating user habits data for a user, consistent with various embodiments. In some embodiments, the process 700 can be executed in environment 100 of FIG. 1. In some embodiments, the process 700 can be executed as part of process 500 during an interaction between a user and the CS 135 in which the CS 135 provides recommendations for a specific service requested by a user, e.g., at block 535.

At block 705, the receiver module 405 receives a text message from the user indicating an acceptance or rejection of a recommendation provided by the CS 135. At block 710, the storage module 430 stores the information indicating the acceptance or rejection of the recommendation as part of the user habits data.

At determination block 715, the context determination module 415 analyzes the text message to determine if the text message includes a reason for the acceptance or rejection of the recommendation. Responsive to a determination that the text message includes a reason for the acceptance or rejection of the recommendation, at block 720, the storage module 430 stores the reason for acceptance or the rejection as part of the user habits data, else the process 700 returns.

Figure 8:
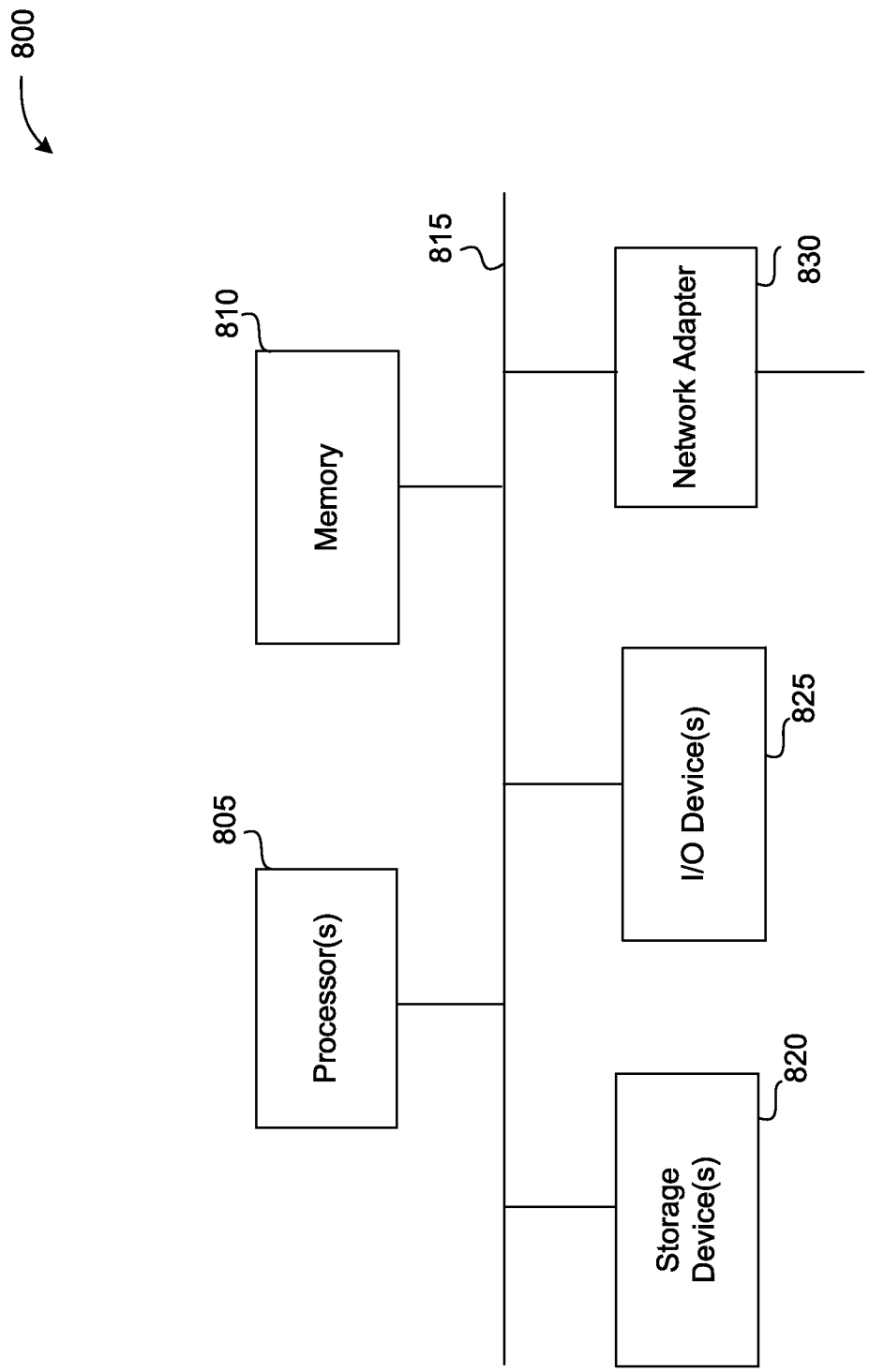
FIG. 8 is a block diagram of a computer system as may be used to implement features of some embodiments of the disclosed technology.

FIG. 8 is a block diagram of a computer system as may be used to implement features of some embodiments of the disclosed technology. The computing system 800 may be used to implement any of the entities, components or services depicted in the examples of FIGS. 1-7 (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the computing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

I claim:

1. A method comprising:
   receiving, at a server, a first message from a user device associated with a first user, the first message including a request for a listing of recommended services to be presented to the first user via a text message;
   deriving, by the server, a first set of explicit parameters from the request for the listing of recommended services in the first message;
   inspecting, by the server, a first repository that includes characteristics relating to the first user based on previously-transmitted messages by the user device to determine a first set of implicit parameters specific to the first user;
   inspecting, by the server, a second repository including a listing of potential services to derive a first listing of recommended services that correspond to the first set of explicit parameters and the first set of implicit parameters;
   determining, by the server, whether the first listing of recommended services falls below a threshold value;
   responsive to determining that the first listing of selected potential services exceeds the threshold value, deriving, by the server, a characteristic common to only a first subset of the first listing of recommended services;
   transmitting, by the server, a second message to the user device that includes the characteristic common to the first subset of the first listing of recommended services;
   receiving, by the server, a third message from the user device server, the third message indicative of whether to apply the characteristic common to the first subset of the first listing of recommended services to the first listing of recommended services;
   generating, by the server, a second listing of recommended services that includes either the first subset of the first listing of recommended services or a remaining subset of the first listing of recommended services based on information included in the third message;
   determining, by the server, whether the second listing of recommended services falls below the threshold value;
   responsive to determining that the second listing of recommended services falls below the threshold value, sending, by the server, a fourth message to the user device that includes either the first subset of the first listing of recommended services or the remaining subset of the first listing of recommended services;
   receiving, by a third-party server, a request from the first user to perform a task associated with a service associated with the first listing of recommended services; and
   performing, by the third-party server, the task using an application programming interface (API) associated with the service associated with the first recommendation.

2. The method of claim 1, wherein the user device includes a mobile computing device associated with the first user configured to communicate to the server via a messaging service provided by a wireless telecommunications network of the mobile computing device.

3. The method of claim 1, further comprising:
   exchanging sets of messages between the server and the user device to sets of parameters from the first user until it is determined that any subsequent group of selected potential services falls below the threshold value.

4. The method of claim 1, further comprising:
   parsing, by the server, the first message using natural language processing to determine words in the first message, the words indicative of the first set of explicit parameters.

5. The method of claim 1, further comprising:
   receiving, at the server, a response from the first user regarding a selection of a first recommendation from the first listing of recommended services via the third message from the user device; and
   storing, by the server, at a storage system associated with the server, an indication that the first user accepted the first recommendation as part of user habit data, the user habit data included as part of the first set of implicit parameters.

6. The method of claim 5, further comprising:
analyzing, by the server, the third message from the first user to determine if the third message includes a reason for the selection of the first recommendation; and
responsive to a determination that the third message includes the reason for the selection of the first recommendation, storing the reason as part of the user habit data.

7. The method of claim 5, further comprising:
analyzing, by the server, the third message from the first user to determine if the third message includes a reason for rejecting any of the first listing of recommended services; and
responsive to a determination that the third message includes the reason for rejecting, storing the reason as part of the user habit data.

8. The method of claim 1, further comprising:
receiving, at the server, a response from the first user regarding a rejection of a first recommendation from the first listing of recommended services via the third message from the user device; and
storing, by the server, at a storage system associated with the server, an indication that the first user rejected the first recommendation as part of user habit data.

9. The method of claim 8, further comprising:
analyzing, by the server, the third message from the first user to determine a reason for the rejection; and
performing, by the server, a revised search using one or more parameters determined based on the reason for the rejection to retrieve a second plurality of recommendations, the second plurality of recommendations excluding a first set of recommendations that match the reason for rejection and including a second set of recommendations that overcome the reason for rejection.

10. The method of claim 2,
wherein the messaging service provided by the wireless telecommunications network of the mobile computing device is a short messaging service, and wherein the first message is a text message.

11. A non-transitory computer-readable storage medium storing computer-readable instructions, comprising:
instructions for receiving, at a server, a first message from a mobile computing device associated with a first user, wherein the first message contains a request for a recommendation for a service to be presented to the first user via a text message;
instructions for analyzing a first set of explicit parameters from the request for the recommendation for the service in the first message;
instructions for inspecting a first repository that includes characteristics relating to the first user based on previously-transmitted messages by the mobile computing device to determine a first set of implicit parameters associated with the first user, the first set of implicit parameters including stored user preferences and user habit data associated with the first user;
instructions for inspecting a second repository including a listing of potential services to derive a first listing of recommended services that correspond to the first set of explicit parameters and the first set of implicit parameters;
instructions for determining whether the first listing of recommended services falls below a threshold value;
responsive to determining that the first listing of recommended services does exceed the threshold value, instructions for deriving a characteristic common to only a first subset of the first listing of recommended services;
instructions for receiving, by the server, a third message from the mobile computing device the third message indicative of whether to apply the characteristic common to the first subset of the first listing of recommended services of the first listing of recommended services;
instructions for generating, by the server, a second listing of recommended services that includes either the first subset of the first listing of recommended services or a remaining subset of the first listing of recommended services based on information included in the third message;
instructions for determining, by the server, whether the second listing of recommended services falls below the threshold value; and
responsive to determining that the second listing of recommended services falls below the threshold value, instructions for sending, by the server, a second message to the mobile computing device including either the first subset of the first listing of recommended services or a remaining subset of the first listing of recommended services;
instructions for receiving, by a third-party server, a request from the first user to perform a task associated with a service associated with the first recommendation, the request to perform the task received via a fourth message from the user device; and
instructions for performing, by the third-party server, the task using an application programming interface (API) associated with the service associated with the first recommendation.

12. The non-transitory computer-readable storage medium of claim 11, further comprising:
instructions for receiving the third message from the mobile computing device including a response from the first user regarding a rejection of the first recommendation;
instructions for analyzing the third message to determine a reason for rejection;
instructions for generating a not-preferred parameter based on the reason for rejection that is used to identify a set of recommendations that match the reason for rejection;
instructions for performing a search using the "not-preferred" parameter to retrieve a plurality of recommendations, the plurality of recommendations excluding the set of recommendations that match the not-preferred parameter; and
instructions for sending one of the plurality of recommendations to the first user as a fourth message to the mobile computing device.

13. The non-transitory computer-readable storage medium of claim 11, wherein the instructions for receiving the first message from the mobile computing device includes instructions for receiving the first message from the mobile computing device via a messaging service provided by a wireless telecommunications network of the mobile computing device.

14. The non-transitory computer-readable storage medium of claim 13, wherein the instructions for receiving the first message via the messaging service includes receiving the first message via a short messaging service, and wherein the first message is a text message.

15. The non-transitory computer-readable storage medium of claim 13, wherein the instructions for receiving the first message from the mobile computing device includes instructions for receiving the first message from the mobile computing device via a social networking application executing at the mobile computing device.

16. A method performed by a server to determine a listing of recommended services to a first user, the method comprising:

receiving a first message from a user device associated with the first user, the first message including a request for the listing of recommended services to be presented to the first user via a text message;

parsing the first message using natural language processing to determine words in the first message;

analyzing the parsed first message to determine a first set of explicit parameters from the request for the listing of recommended services in the first message;

inspecting a stored registry of previously-transmitted messages by the user device to determine a first set of implicit parameters associated with the first user;

retrieving information relating to multiple service providers from a series of third-party servers via a computing network;

comparing the first set of explicit parameters and the first set of implicit parameters with a listing of potential services to determine a first listing of recommended services;

determining whether the first listing of recommended services falls below a threshold value;

responsive to determining that the first listing of recommended services does not fall below the threshold value, sending at least one subsequent message requesting subsequent explicit parameters supplementing the first set of explicit parameters;

responsive to sending a first subsequent message, receiving a third message from the user device the third message indicative of whether to apply the characteristic common to a first subset of the first listing of recommended services to the first listing of recommended services;

generating a second listing of recommended services that includes either the first subset of the first listing of recommended services or a remaining subset of the first listing of recommended services based on information included in the third message;

determining whether the second listing of recommended services falls below the threshold value;

responsive to determining that the second listing of recommended services falls below the threshold value, sending a fourth message to the user device including either the first subset of the first listing of recommended services or a remaining subset of the first listing of recommended services, the fourth message including a subset of the retrieved information retrieved from the series of third-party servers that corresponds to each entry included in either the first subset of the first listing of recommended services or the remaining subset of the first listing of recommended services;

receiving, by a third-party server of the series of third-party servers, a request from the first user to perform a task associated with a service associated with the first listing of recommended services, the request received via the fourth message from the user device; and performing, by the third-party server of the series of third-party servers, the task using an application programming interface (API) associated with the service associated with the first recommendation.

17. The method of claim 16, wherein the user device includes a mobile computing device associated with the first user configured to communicate to the server via a messaging service provided by a wireless telecommunications network of the mobile computing device, the first message including a text message transmitted over the wireless telecommunications network.

18. The method of claim 16, further comprising:

receiving, at the server, a response from the first user regarding a selection of a first recommendation from the first listing of recommended services via the third message from the user device; and storing, by the server, at a storage system associated with the server, an indication that the first user accepted the first recommendation as part of user habit data, the user habit data included as part of the first set of implicit parameters.

19. The method of claim 18, further comprising:

analyzing, by the server, the third message from the first user to determine if the third message includes a reason for the selection of the first recommendation; and responsive to a determination that the third message includes the reason for the selection of the first recommendation, storing the reason as part of the user habit data.

20. The method of claim 18, further comprising:

analyzing, by the server, the third message from the first user to determine if the third message includes a reason for rejecting any of the first listing of recommended services; and responsive to a determination that the third message includes the reason for rejecting, storing the reason as part of the user habit data.

21. The method of claim 16, further comprising:

receiving, at the server, a response from the first user regarding a rejection of a first recommendation from the listing of selected recommendations via the third message from the user device; and storing, by the server, at a storage system associated with the server, an indication that the first user rejected the first recommendation as part of user habit data.

22. The method of claim 21, further comprising:

analyzing, by the server, the third message from the first user to determine a reason for the rejection; and performing, by the server, a revised search using one or more parameters determined based on the reason for rejection to retrieve a second plurality of recommendations, the second plurality of recommendations excluding a first set of recommendations that match the reason for rejection and including a second set of recommendations that overcome the reason for rejection.

23. A system, comprising:

a processor;

a receiver module to receive, at a server, a first set of messages from a mobile computing device associated with a first user, wherein at least one of the first set of messages contains a request for a recommendation for a service;

a transmitter module to send, by the server, a second set of messages to the mobile computing device to elicit information from the first user that is to be used by the server in generating the recommendation, wherein at least some of the first set of messages are responses to the at least some of the second set of messages, and includes information requested by the at least some the second set of messages;

a context determination module to determine, at the server, a context of the request using an artificial intelligence technique, the context including explicit parameters and implicit parameters, which are used for performing a search to generate the recommendation, the context determination module further configured to determine the context by:

extracting the explicit parameters from the first set of messages, the explicit parameters provided by the first user in the first set of messages, deriving at least some of the implicit parameters based on information provided in the first set of messages and/or information received by a second user associated with the server, and deriving at least some of the implicit parameters based on user habits data of the first user; and a search module to perform, at the server, a search based on the context to retrieve a first recommendation for the service, wherein the search module is further configured to send the first recommendation to the first user as a first message to the mobile computing device, to receive, by a third-party server, a request from the first user to perform a task associated with a service associated with the first recommendation, and to perform, by the third-party server, the task using an application programming interface (API) associated with the service associated with the first recommendation.

24. The system of claim 23, wherein the transmitter module is further configured to receive a second message from the mobile computing device including a rejection of the first recommendation, and wherein the search module is further configured to perform a revised search for retrieving a plurality of recommendations, the plurality of recommendations excluding a set of recommendations that match with a reason for the rejection.

25. The system of claim 24 further comprising:

a storage module to store the rejection of the first recommendation and the reason for rejection as part of user habits data of the first user in a storage system associated with the server.

26. The system of claim 23, wherein the receiver module is configured to receive the first set of messages from the mobile computing device via a messaging service provided by a wireless telecommunications network of the mobile computing device.

27. The system of claim 26, wherein receiver module is configured to receive the first set of messages via a short messaging service, and wherein the first set of messages are text messages.

* * * * *